J. E. JAMES.
ELECTRICAL ARRANGEMENT FOR PROTECTING SHIPS' BOTTOMS FROM BARNACLES OR AQUATIC LIFE AND SUCH LIKE.
APPLICATION FILED MAY 3, 1910.
994,405.
Patented June 6, 1911.
FIG. 1.
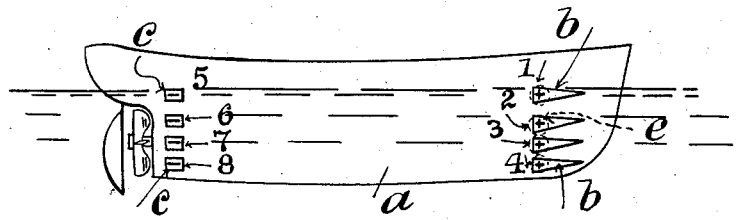
FIG. 2.
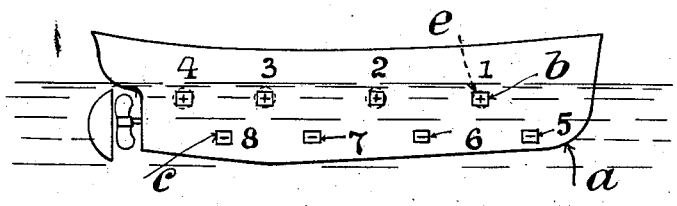
FIG. 3.
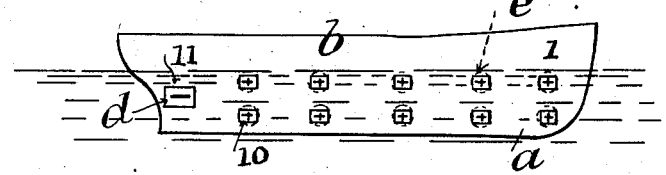
FIG. 4.
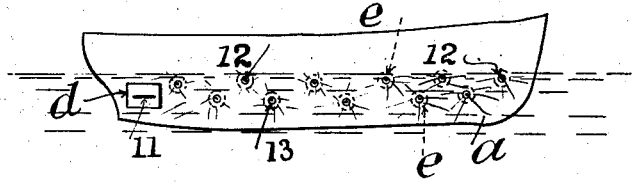
FIG. 5.
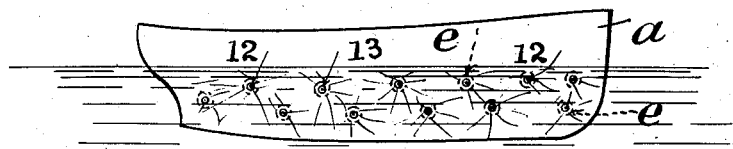
FIG. 6. FIG. 7.
WITNESSES.
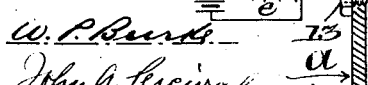
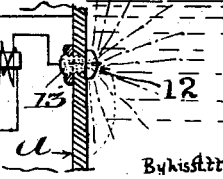
INVENTOR
John Evans James
By his Attorney to your page content here

UNITED STATES PATENT OFFICE.

JOHN EVANS JAMES, OF BOLTON, ENGLAND.

ELECTRICAL ARRANGEMENT FOR PROTECTING SHIPS' BOTTOMS FROM BARNACLES OR AQUATIC LIFE AND SUCH LIKE.

994,405.　　　　　　　Specification of Letters Patent.　　Patented June 6, 1911.

Application filed May 3, 1910. Serial No. 559,231.

*To all whom it may concern:*

Be it known that I, JOHN EVANS JAMES, a subject of the King of Great Britain and Ireland, residing at 1 Acresfield, Bolton, in the county of Lancaster, England, military and merchant tailor, have invented new and useful Improvements in Electrical Arrangements for Protecting Ships' Bottoms from Barnacles or Aquatic Life and Such Like, of which the following is a specification My said invention relates to electrical arrangements or means for electrifying the water immediately surrounding a ship's hull, with the express object of preventing the attachment thereto of aquatic life, such as barnacles, &c.

The purpose of the invention is, to distribute high tension electricity in the immediate vicinity of the submerged hull so as to impart a shock to animal or aquatic life, and this by an "induced" current, whereby due to a high tension discharge a shock is imparted to such organisms and they are prevented from attaching themselves. By such discharges of high tension current the hull is kept clean.

Now according to my invention I propose to electrify the water surrounding the ship by suitably dividing one pole of a coil, battery, dynamo, or other electrical source of energy, into a number of distributing points or terminals and these distributing points may be connected to insulated plates attached to the outside of the ship's bottom. By this, I get a discharge of current from a number of points arranged at intervals over the hull. The return or "earth" may be through a negative terminal attached to an insulated plate carried on the hull, but, for preference, I also divide the return or other pole and connect the divided points to insulated plates attached to the outside of the vessel and so the electric current flows from one set of discharge points to other points through the surrounding water space. Instead of using outside insulated plates I may pierce the hull of the vessel and insert insulators which carry or sustain discharge points or terminals, or current distributers, and allow the current to "earth" through the hull itself, or a negative terminal or terminals may be fitted to return the current. Such a disposition of the distributing points is arranged for, as will allow of the current exercising an equal or even effect over the surface to be protected. I also use coils or transformers whereby with a low voltage supply I can yet get discharges of high tension current such as will have the desired effect over a considerable area and this is an important feature of my invention.

I illustrate by diagrams the application of my invention.

In Figure 1 I show a positive pole divided into a number of discharge points or terminals marked 1, 2, 3, 4 and arranged one above the other in the bow of the vessel *a*. The discharge points or terminals are secured to insulated plates marked *b*. Respecting the negative pole for the return I divide this similarly into a number of return points or terminals, 5, 6, 7, 8 carried upon insulated plates *c* secured to the vessel's stern.

In Fig. 2 I show the positive points or terminals 1, 2, 3, 4 distributed along the length of the vessel and carried by insulated plates *b*, while the negative points 5, 6, 7, 8 are carried at a lower level on insulated plates *c*. In Fig. 3 the positive pole is divided-up into a number of points or terminals 1 to 10 carried on insulated plates *b* secured to the vessel's side, while the return is through a negative terminal 11 fixed on an insulated plate *d*.

By Fig. 4 I indicate the use of discharge terminals or points 12 from dividing the pole or supply source into a number of discharge points supplying sparking plugs or discharge terminals, the discharge points 12 being each separately sustained by annular insulators 13 fixed in holes bored in the shell of the vessel (see Figs. 6 and 7). In this case, the return is through a negative terminal 11 carried upon an insulated plate *d*.

In Fig. 5 the use of discharge terminals or points 12 from a divided pole is also indicated, each discharge point or terminal being separately sustained by annular insulators 13 fixed in holes bored or fashioned in the exterior plates of the ship. The current returns or "earths" through the plates of the ship itself in this case.

In Fig. 6 I indicate the application of an insulated plug 13 with discharge point 12 as applied from the interior of the vessel and also an induction coil *e* whereby a high tension discharge is obtained for my purpose.

By Fig. 7 I show another insulating plug 13 with discharge point or terminal 12, the plug being passed into position from the outside of the vessel. An induction coil is also indicated in this figure. In the cases of an insulated plug introduced into a bored hole in the vessel plates, less friction with the water is set up.

I use such a system of wiring and such electrical devices, either automatic or otherwise, as may be necessary to enable me to discharge at regular or other intervals high tension electric current from the discharge or delivery points distributed over the ship's hull to electrify the water immediately about the ship. By the use of high tension current I get an effect over a considerable area of water from each point or terminal. I make use of induction coils or transformers or other devices which will give me a high tension current for the requisite discharges, and I for preference work from a low tension current and by such devices as induction coils, &c., transform same into high tension current. In certain of the figures I have indicated induction coils for transforming the current conveyed by the divided pole supply wires into high tension current and these coils are marked e. Likewise by switches, commutators or such like I may arrange for the current to be altered or regulated to better perform the object of my invention. That object resides, in getting a discharge of high tension current from a divided pole or poles using induction coils, transformers or such like, which, by points or terminals, distributes high tension electricity over the water area adjacent to the vessel, the current reëntering the vessel as necessary. By said system, repeated shocks are imparted to any aquatic life approaching or encountering the vessel. It is to be understood that a number of poles may be divided each into its separate section or batch of distributing points distributing high tension current.

The induction coils or transformers are in all cases so combined, and the wiring so arranged, as to give current of a sufficiently high tension for the purpose in view.

I declare that what I claim is.

1. In a ship-protecting device, in combination, a source of current, a plurality of induction coils, electrical connections between said source of current and the primary windings of said coils, a plurality of insulated supports on the sides of said ship, and discharge points carried by said supports, said discharge points being electrically connected to the secondary windings of said coils, said ship being free from extraneous means for the return of the current.

2. In a ship-protecting device, in combination, a source of current, a plurality of induction coils, electrical connections between said source of current and the primary windings of said coils, a plurality of insulated supports on the sides of said ship, and discharge points carried by said supports, said discharge points being electrically connected to the secondary windings of said coils, current returning means electrically connected to said secondary windings for conducting the current from the discharge points, said means being free from any portion extending beyond the sides of the ship.

In testimony whereof I have signed my name to this specification in the presence of two subscribing witnesses.

JOHN EVANS JAMES.

Witnesses:
 JOSHUA ENTWISLE,
 ALFRED STUART YATES.